United States Patent [19]

Gettings et al.

[11] Patent Number: 5,019,173

[45] Date of Patent: May 28, 1991

[54] CLEANING METHOD FOR WATER CONTAINING VESSELS AND SYSTEMS

[75] Inventors: Richard L. Gettings, Freeland; James B. McGee, Sanford; William C. White, Midland; Frank Plahutnik, Jr., Midland, all of Mich.

[73] Assignee: Dow Corning Corporation, Midland, Mich.

[21] Appl. No.: 250,644

[22] Filed: Sep. 29, 1988

[51] Int. Cl.$^5$ .................. B08B 3/14; B08B 17/00
[52] U.S. Cl. ...................... 134/4; 210/169; 210/501; 210/508; 427/393.5; 427/393.6; 134/42
[58] Field of Search .............. 210/169, 501, 508; 134/4, 42; 427/393.6, 393.5, 393.51

[56] References Cited

U.S. PATENT DOCUMENTS

| | | | |
|---|---|---|---|
| 3,560,385 | 2/1971 | Roth | 252/49.6 |
| 3,661,963 | 5/1972 | Pepe et al. | 260/448 |
| 3,730,701 | 5/1973 | Isquith et al. | 71/67 |
| 3,794,736 | 2/1974 | Abbott et al. | 424/78 |
| 3,817,739 | 6/1974 | Abbott et al. | 71/67 |
| 3,860,709 | 1/1975 | Abbott et al. | 424/184 |
| 3,865,728 | 2/1975 | Abbott et al. | 210/169 |
| 4,221,688 | 9/1980 | Johnson et al. | 524/251 |
| 4,259,103 | 3/1981 | Malek et al. | 71/67 |
| 4,273,813 | 1/1981 | Meddaugh | 427/393.6 |
| 4,282,366 | 8/1981 | Eudy | 556/413 |
| 4,371,577 | 2/1983 | Sato et al. | 428/96 |
| 4,394,378 | 7/1983 | Klein | 424/184 |
| 4,395,454 | 7/1983 | Baldwin | 428/290 |
| 4,406,892 | 9/1983 | Eudy | 424/184 |
| 4,408,996 | 10/1983 | Baldwin | 8/490 |
| 4,411,928 | 10/1983 | Baldwin | 427/2 |
| 4,414,268 | 11/1983 | Baldwin | 428/289 |
| 4,425,372 | 1/1984 | Baldwin | 427/2 |
| 4,465,712 | 8/1984 | McVie | 427/393.5 |
| 4,467,013 | 8/1984 | Baldwin | 428/289 |
| 4,504,541 | 3/1985 | Yasuda et al. | 428/264 |
| 4,564,456 | 1/1986 | Homan | 210/698 |
| 4,615,937 | 10/1986 | Bouchette | 428/288 |
| 4,631,273 | 12/1986 | Blehm et al. | 514/29 |
| 4,631,297 | 12/1986 | Battice et al. | 521/78 |
| 4,692,374 | 9/1987 | Bouchette | 428/288 |
| 4,721,511 | 1/1988 | Kupits | 8/188 |

FOREIGN PATENT DOCUMENTS

| | | |
|---|---|---|
| 156809 | 3/1985 | Japan . |
| 8601457 | 1/1987 | PCT Int'l Appl. . |
| 1386876 | 3/1975 | United Kingdom . |
| 1433303 | 4/1976 | United Kingdom . |

OTHER PUBLICATIONS

Applied Microbiology, vol. 24, No. 6, Dec. 1972, A. J. Isquith et al., "Surface Bonded Antimicrobial Activity of an Organosilicon Quaternary Ammonium Chloride", pp. 859–863.

*Primary Examiner*—H. M. S. Sneed
*Assistant Examiner*—Zeinab E. El-Arini
*Attorney, Agent, or Firm*—Jim L. DeCesare

[57] ABSTRACT

A method of enchancing the cleanability and facilitating the removal of algae and other microorganisms from surfaces prone to biofouling by immobilizing on said surfaces and bonding thereto a coating of organosilanes, forming on the coated surfaces a layer of dead cells of the algae and other microorganisms, utilizing the layer of dead cells and inherent release characteristics of silicone surface as a release medium to facilitate removal of succeeding layers of algae and other microorganisms that accumulate thereon, and cleaning the surfaces by dislodging the accumulated layers from the release medium layer.

32 Claims, No Drawings

CLEANING METHOD FOR WATER CONTAINING VESSELS AND SYSTEMS

BACKGROUND OF THE INVENTION

This invention relates to a swimming pool cleaning method wherein an organosilane is immobilized as a coating on the pool walls in order to facilitate removal of algae and other microbial and nonmicrobial stains and soils.

Antimicrobial agents are chemical compositions that are used to prevent microbiological contamination and deterioration of products, materials, and systems. Particular areas of application of antimicrobial agents and compositions are, for example, cosmetics, disinfectants, sanitizers, wood preservation, food, animal feed, cooling water, metalworking fluids, hospital and medical uses, plastics and resins, petroleum, pulp and paper, textiles, latex, adhesives, leather and hides, and paint slurries. Of the diverse categories of antimicrobial agents and compositions, quaternary ammonium compounds represent one of the largest of the classes of antimicrobial agents in use At low concentrations, quaternary ammonium type antimicrobial agents are bacteriostatic, fungistatic, algistatic, sporostatic, and tuberculostatic. At medium concentrations they are bactericidal, fungicidal, algicidal, and viricidal against lipophilic viruses. Silicone quaternary ammonium salt compounds are well known as exemplified by U.S. Pat. No. 3,560,385, issued February 2, 1971, and the use of such compounds as antimicrobial agents is taught, for example, in a wide variety of patents such as U.S. Pat. Nos. 3,730,701, issued May 1, 1973, and 3,817,739, issued June 18, 1974, where the compounds are used to inhibit algae; 3,794,736, issued February 26, 1974, and 3,860,709, issued January 14, 1975, where they are employed for sterilizing or disinfecting a variety of surfaces and instruments; 3,865,728, issued February 11, 1975, where the compounds are used to treat aquarium filters; 4,259,103, issued March 31, 1981; and in British Pat. No. 1,386,876, of March 12, 1975. Published unexamined European Application No. 228464 of July 15, 1987, teaches that microorganisms on plants can be killed by the application thereto of an aqueous mixture of a surfactant and an organosilicon quaternary ammonium compound. U.S. Pat No. 4,564,456, issued Jan. 14, 1986, discloses organosilanes as anti-scale agents in water systems. In a particular application of an antimicrobial silicone quaternary ammonium compound, a paper substrate is rendered resistant to the growth of microorganisms in U.S. Pat. No. 4,282,366, issued Aug. 4, 1981. In U.S. Pat. No 4,504,541, issued Mar. 12, 1985, an antimicrobial fabric is disclosed which is resistant to discoloration and yellowing by treatment of the fabric with a quaternary ammonium base containing an organosilicone. U.S. Pat. No. 4,615,937, issued Oct. 7, 1986, as well as its companion U. S. Pat. No. 4,692,374, issued Sept. 8, 1987, relate to wet wiper towelettes having an antimicrobial agent substantive to the fibers of the web and being an organosilicon quaternary ammonium compound. In a series of Burlington Industries, Inc. U.S. Pat. Nos. 4,408,996, issued Oct. 11, 1983, 4,414,268, issued Nov. 8, 1983, 4,425,372, issued Jan. 10, 1984, and 4,395,454, issued July 26, 1983, such compounds are disclosed to be useful in surgical drapes, dressings, and bandages. This same assignee also discloses these compounds as being employed in surgeons' gowns in U.S. Pat. Nos. 4,411,928, issued Oct. 25, 1983, and 4,467,013, issued Aug. 21, 1984. Organosilicon quaternary ammonium compounds have been employed in carpets, in U.S. Pat. No. 4,371,577, issued Feb. 1, 1983; applied to walls, added to paints, and sprayed into shoes, in U.S. Pat. No. 4,394,378, issued July 19, 1983; applied to polyethylene surfaces and used in pillow ticking in U.S. Pat. No. 4,721,511, issued Jan. 26, 1988, in flexible polyurethane foams of fine-celled, soft, resilient articles of manufacture in U.S. Pat. No. 4,631,297, issued Dec. 23, 1986; and mixed with a surfactant in Japanese Kokai Application No. 58-156809, filed Aug. 26, 1983, of Sanyo Chemical Industries, Ltd., for the purpose of achieving uniformity of distribution of the compounds to a surface. Thus, the versatility of such compositions is readily apparent.

However, it is not known in the prior art to utilize an immobilized organosilane for the purpose of providing a dead cell layer of algae, and employing the dead cell layer of algae as a release medium in order to facilitate cleaning of swimming pool surfaces, as is taught in accordance with the present invention. Organosilanes have been added to water systems as in U.S. Pat. No. 4,564,456, but the compounds function to inhibit the formation of scale. In U.S. Pat. No. 3,730,701, organosilanes function in water systems to flocculate algae which is subsequently removed by filtration or settling. Such compounds have also been bonded to surfaces such as fibrous filter media in order to kill algae in U.S. Pat. Nos. 3,817,739, and 3,865,728. None teach the concepts disclosed herein, nor the specific application of the concept to swimming pools.

SUMMARY OF THE INVENTION

This invention relates to a method of enhancing the cleanability and facilitating the removal of algae and other microorganisms and stains and soils from surfaces prone to biofouling and soiling by being exposed to and brought into contact with aqueous media containing algae, other microorganisms, and soiling elements, comprising immobilizing on said surfaces and bonding thereto a coating of an organosilane and organosilane copolymers, the organosilanes being compatible in the aqueous media under the following conditions:

| | | | | |
|---|---|---|---|---|
| chlorine levels | 0.5 | to | 20 | ppm |
| cyanurates | 25 | to | 100 | ppm |
| calcium hardness | 50 | to | 2,000 | ppm |
| pH | 4 | to | 8.5 | |
| alkalinity | 20 | to | 160 | ppm | forming on the coated surfaces a layer of dead cells of the algae and other microorganisms, utilizing the layer of dead cells as a release medium to facilitate removal of succeeding layers of algae and other microorganisms that accumulate thereon, and cleaning the surfaces by dislodging the accumulated layers from the release medium layer, the organosilane having the general formula selected from the consisting of:

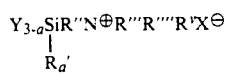

and

-continued

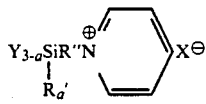

wherein, in each formula,
Y is R or RO where R is an alkyl radical of 1 to 4 carbon atoms or hydrogen;
a has a value of 0, 1 or 2;
R' is a methyl or ethyl radical;
R" is an alkylene group of 1 to 4 carbon atoms;
R''', R''' and R$^v$ are each independently selected from a group consisting of alkyl radicals of 1 to 18 carbon atoms, $-CH_2C_6H_5$, $-CH-CH_2OH$, and $-(CH_2)_xNHC(O)R^{vi}$, wherein x has a value of from 2 to 10 and R$^{vi}$ is a perfluoroalkyl radical having from 1 to 12 carbon atoms;
X is chloride, bromide, fluoride, iodide, acetate or tosylate.

In a particularly preferred embodiment of the present invention, the surfaces form the configuration of a swimming pool, and the organosilane or silane mixtures are added to water contained therein and migrates to the pool surfaces to form the coating. The organosilane is added to the pool water in an amount sufficient to provide a concentration in the pool water in excess of about fifteen parts per million of the organosilane. Alternatively, the surfaces may include a liner, and the organosilane is sprayed onto the liner in order to provide the coating. In this case, the level of the organosilane present as a coating on the liner is in excess of about five-hundred ug/g of liner.

It is therefore the object of the present invention to provide a method of facilitating the cleaning of swimming pool surfaces by employing a release layer of dead microbial cells to ease the removal of accumulated stains and microorganisms.

These and other features, objects, and advantages, of the present invention will be apparent when considered in light of the following detailed description thereof.

DETAILED DESCRIPTION OF THE INVENTION

Ammonium compounds in which all of the hydrogen atoms have been substituted by alkyl groups are called quaternary ammonium salts. These compounds may be represented in a general sense by the formula:

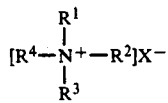

The nitrogen atom includes four covalently bonded substituents that provide a cationic charge. The R groups can be any organic substituent that provides for a carbon and nitrogen bond with similar and dissimilar R groups. The counterion X is typically halogen. Use of quaternary ammonium compounds is based on the lipophilic portion of the molecule which bears a positive charge. Since most surfaces are negatively charged, solutions of these cationic surface active agents are readily adsorbed to the negatively charged surface. This affinity for negatively charged surfaces is exhibited by 3-(trimethyoxysilyl)propyldimethyloctadecyl ammonium chloride (TMS) of the formula:

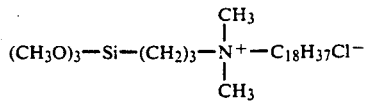

In the presence of moisture, this antimicrobial agent imparts a durable, wash resistant, broad spectrum biostatic surface antimicrobial finish to a substrate. The organosilicon quaternary ammonium compound is leach resistant, nonmigrating, and is not consumed by microorganisms. It is effective against gram positive and gram negative bacteria, fungi, algae, yeasts, mold, rot, and mildew. The silicone quaternary ammonium salt provides durable, bacteriostatic, fungistatic, and algistatic surfaces. It can be applied to organic or inorganic surfaces as a dilute aqueous or solvent solution of 0.1-1.5 percent by weight of active ingredient. After the alkoxysilane is applied to a surface, it is chemically bonded to the substrate by condensation of the silanol groups at the surface. The pure compound is crystalline whereas methanol solutions of the compound are low viscosity light to dark amber liquids, soluble in water, alcohols, ketones, esters, hydrocarbons, and chlorinated hydrocarbons. The compound has been used in applications such as, for example, socks, filtration media, bed sheets, blankets, bedspreads, carpet, draperies, fire hose fabric materials, humidifier belts, mattress pads, health care apparel, mattress ticking, underwear, nonwoven disposable diapers, nonwoven fabrics, outerwear fabrics, nylon hosiery, vinyl paper, wallpaper, polyurethane cushions, roofing materials, sand bags, tents, tarpaulins, sails, rope, blood pressure cuffs, athletic and casual shoes, shoe insoles, shower curtains, toilet tanks, toilet seat covers, throw rugs, towels, umbrellas, upholstery fiberfill, intimate apparel, wiping cloths, and medical devices such as blood pressure cuffs.

In the Examples as well as in the Tables, the composition identified as TMS refers to a product manufactured by the Dow Corning Corporation, Midland, Mich., as an antimicrobial agent. This compound is 3-(trimethoxysilyl)-propyloctadecyldimethyl ammonium chloride referred to above diluted to forty-two percent active ingredients by weight with methanol.

The silanes useful in this invention have the general formula

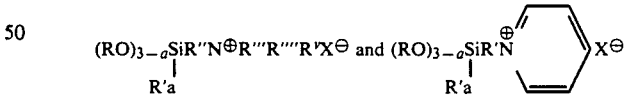

It should be noted that generically, these materials are quaternary ammonium salts of silanes. Most of the silanes falling within the scope of this invention are known silanes and references disclosing such silanes are numerous. One such reference, U.S. Pat. No. 4,259,103, issued to James R. Malek and John L. Speier, on Mar. 31, 1981, discusses the use of such silanes to render the surfaces of certain substrates antimicrobial. British Pat. No. 1,433,303, issued to Charles A. Roth shows the use of fillers treated with certain silanes to be used in paints and the like to give antimicrobial effects.

Numerous other publications have disclosed such silanes, namely, A. J. Isquith, E. A. Abbott and P. A. Walters, Applied Microbiology, December, 1972, pages 859-863; P. A. Walters, E. A. Abbott and A. J. Isquith, Applied Microbiology, 25, No. 2, p. 253-256, February 1973 and E. A. Abbott and A. J. Isquith, U.S. Pat. No. 3,794,736 issued Feb. 26, 1974, U.S. Pat. No. 4,406,892, issued September 27, 1983, among others.

For purposes of this invention, the silanes can be used neat or they can be used in solvent or aqueous-solvent solutions. When the silanes are used neat, the inventive process is preferably carried out in a system in which some small amount of water is present. If it is not possible to have a system with some small amount of water present, then a water soluble or water-dispersable, low molecular weight hydrolyzate of the silane may be used. What is important is the fact that the durability of any effect produced by the silane as part of a product requires that the silane molecule react with a surface to a certain extent. The most reactive species, as far as the silanes are concerned, is the $\equiv$SiOH that is formed by hydrolysis of the alkoxy groups present on the silane. The $\equiv$SiOH groups tend to react with the surface and bind the silanes to the surface. It is believed by the inventor that even though the prime mode of coupling to the surface system is by the route described above, it is also believed by the inventor that the alkoxy groups on the silicon atom may also participate in their own right to bind to the surface.

Preferred for this invention is a reactive surface containing some small amount of water. By "reactive", it is meant that the surface must contain some groups which will react with some of the silanols generated by hydrolysis of the silanes of this invention.

R in the silanes of this invention are alkyl groups of 1 to 4 carbon atoms. Thus, useful as R in this invention are the methyl, ethyl, propyl and butyl radicals. In the above formulas RO can also be R. R can also be hydrogen thus indicating the silanol form, i.e. the hydrolyzate. The value of a is 0, 1 or 2 and R' is a methyl or ethyl radical.

R" for purposes of this invention is an alkylene group of 1 to 4 carbon atoms. Thus, R" can be alkylene groups such as methylene, ethylene, propylene, and butylene. R''', R'''', and R$^v$ are each independently selected from a group which consists of alkyl radicals of 1 to 18 carbons, —CH$_2$C$_6$H$_5$, —CH$_2$CH$_2$OH, —CH$_2$OH, and —(CH$_2$)$_x$NHC(O)R$^{vi}$. x has a value of from 2 to 10 and R$^{vi}$ is a perfluoroalkyl radical having from 1 to 12 carbon atoms. X is chloride, bromide, fluoride, iodide, acetate or tosylate.

Preferred for this invention are the silanes of the general formula

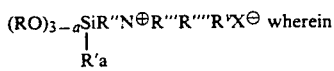

R is methyl or ethyl; a has a value of zero; R" is propylene; R''' is methyl or ethyl; R'''' and R$^v$ are selected from alkyl groups containing 1 to 18 carbon atoms wherein at least one such group is larger than eight carbon 5 atoms and x is either chloride, acetate or tosylate. Most preferred for this invention are those silanes having the formula

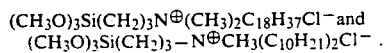

As indicated above, most of these silanes are known from the literature and methods for their preparation are known as well. See, for example, U.S. Pat. Nos. 4,282,366, issued Aug. 4, 1981; 4,394,378, issued July 19, 1983, and 3,661,963 issued May 9, 1972, among others.

Specific silanes within the scope of the invention resented by the formulae:

(CH$_3$O)$_3$Si(CH$_2$)$_3$N$^-$(CH$_3$)$_2$C$_{18}$H$_{37}$Cl$^-$, (CH$_3$O)$_3$Si(CH$_2$)$_3$N$^+$(CH$_3$)$_2$C$_{18}$H$_{37}$Br$^-$, (CH$_3$O)$_3$Si(CH$_2$)$_3$N$^+$(C$_{10}$H$_{21}$)$_2$CH$_3$Cl$^-$, (CH$_3$O)$_3$Si(CH$_2$)$_3$N$^+$(C$_{10}$H$_{21}$)$_2$CH$_3$Br$^+$, (CH$_3$O)$_3$Si(CH$_2$)$_3$N$^+$(CH$_3$)$_3$CL$^-$, (CH$_3$O)$_3$SiCH$_2$CH$_2$CH$_2$P$^+$(C$_6$H$_5$)$_3$Cl$^-$, (CH$_3$O)$_3$SiCH$_2$CH$_2$CH$_2$P$^+$(C$_6$H$_5$)$_3$Br$^-$, (CH$_3$O)$_3$SiCH$_2$CH$_2$CH$_2$P$^+$(CH$_3$)$_3$Cl$^-$, (CH$_3$O)$_3$SiCH$_2$CH$_2$CH$_2$P$^+$(C$_6$H$_{13}$)$_3$Cl$^-$, (CH$_3$)$_3$Si(CH$_2$)$_3$N$^+$(CH$_3$)$_2$C$_{12}$H$_{25}$Cl$^-$, (CH$_3$)$_3$Si(CH$_2$)$_3$N$^+$(C$_{10}$H$_{21}$)$_2$CH$_3$Cl$^-$, (CH$_3$)$_3$Si(CH$_2$)$_3$N$^+$(CH$_3$)$_2$C$_{18}$H$_{37}$Cl$^-$, (CH$_3$O)$_3$Si(CH$_2$)$_3$N$^+$(CH$_3$)$_2$C$_4$H$_9$Cl$^-$·

(C$_2$H$_5$O)$_3$Si(CH$_2$)$_3$N$^+$(CH$_3$)$_2$C$_{18}$h$_{37}$Cl$^-$, (CH$_3$O)$_3$S (CH$_2$)$_3$N$^+$(CH$_3$)$_2$CH$_2$C$_6$H$_5$Cl$^-$, (CH$_3$O)$_3$Si(CH$_2$)$_3$N$^+$(CH$_3$)$_2$CH$_2$CH$_2$OHCl$^-$,

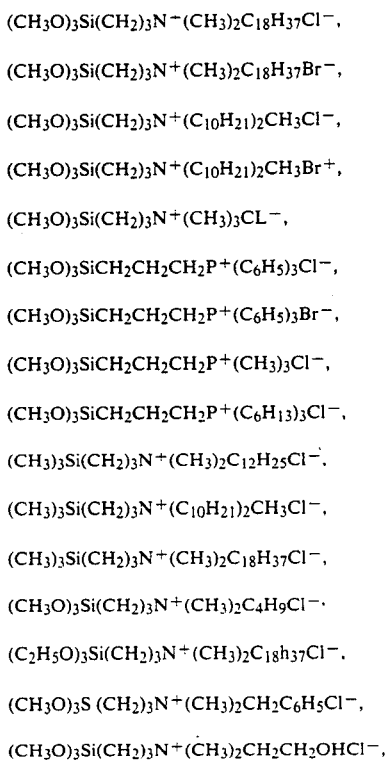

(CH$_3$O)$_3$Si(CH$_2$)$_3$N$^+$(CH$_3$)$_2$(CH$_2$)$_3$NH-C(O)(CF$_2$)$_6$CF$_3$Cl$^-$, (CH$_3$O)$_3$Si(CH$_2$)$_3$N$^+$(C$_2$H$_5$)$_3$Cl$^-$.

Swimming pools include recirculation equipment, and because the water is continuously treated by mechanical filtration and by the addition of various categories of chemicals, the same water is recycled rather than being changed. Chemicals must be added to the water in order to kill and control disease causing and fouling microorganisms introduced into the water by swimmers and dirt entering the pool. It is also necessary to destroy or control algae whose spores are carried into the pool water by the wind and rain. Excessive algae accumulation results in discolored water, unsightly growths on the walls and pool bottoms, clogging of filtration equipment, and is a breeding ground for bacteria. Algae causes slipperiness, develops malodors, clouds water, increases the chlorine demand in the pool as well as bacterial growth, and results in stains on surfaces. Algae growth is promoted by high temperatures, nutrient build up, and sunlight, common to swimming pools and other recirculating water systems. Three forms of algae most often found in swimming pools are green algae, blue-green algae referred to as black algae, and mustard or yellow algae. Green algae remain suspended in the water, while the black and yellow algal types attach to pool surfaces where they become firmly fixed by penetrating cracks, crevices, and the grouting of the pool surface construction. While in the following Examples reference is made to swimming pools, the concept is applicable to spas and hot tubs, and other recirculating water systems.

EXAMPLE I

In order to determine if the compound TMS exhibits any adverse reactions characteristic of incompatibility such as clouding, precipitation, and foaming, in systems typical of swimming pool, spa environments, or other recirculating water systems, a series of tests were conducted employing TMS at three different concentration levels of two, four, and eight parts per million, in a container of water at extreme concentrations of chlorine, cyanurates, hardness, alkalinity, and pH. A blank control was used for comparative purposes. Observations were recorded over a period of forty-eight hours. At the end of forty-eight hours, a shock treatment was performed, in which a concentrated two percent solution of TMS was added to each system at the most extreme levels. The shock treatment was intended to simulate the initial addition of TMS into pool water. The results of these tests are tabulated in Tables I to VII. No adverse reaction was noted in any of the systems or conditions.

TABLE I

COMPATIBILITY TESTING - CHLORINE AND TMS -DEIONIZED WATER-

| TMS | Time Observed | 0.5 ppm Cl | 1 ppm Cl | 5 ppm Cl | 10 ppm Cl | 20 ppm Cl |
|---|---|---|---|---|---|---|
| 0 | 0 hours | clear | clear | clear | clear | clear |
|   | 4 hours | clear | clear | clear | clear | clear |
|   | 24 hours | clear | clear | clear | clear | clear |
|   | 48 hours | clear | clear | clear | clear | clear |
| 2 ppm | 0 hours | clear | clear | clear | clear | clear |
|   | 4 hours | clear | clear | clear | clear | clear |
|   | 24 hours | clear | clear | clear | clear | clear |
|   | 48 hours | clear | clear | clear | clear | clear |
| 4 ppm | 0 hours | clear | clear | clear | clear | clear |
|   | 4 hours | clear | clear | clear | clear | clear |
|   | 24 hours | clear | clear | clear | clear | clear |
|   | 48 hours | clear | clear | clear | clear | clear |
| 8 ppm | 0 hours | clear | clear | clear | clear | clear |
|   | 4 hours | clear | clear | clear | clear | clear |
|   | 24 hours | clear | clear | clear | clear | clear |
|   | 48 hours | clear | clear | clear | clear | clear |
| Shock | — | clear | clear | clear | clear | clear |

TABLE II

COMPATIBILITY TESTING - CYANURATE AND TMS -DEIONIZED WATER-

| TMS | Time Observed | Cyanurate 25 ppm | Cyanurate 50 ppm | Cyanurate 100 ppm |
|---|---|---|---|---|
| 0 | 0 hours | clear | clear | clear |
|   | 4 hours | clear | clear | clear |
|   | 24 hours | clear | clear | clear |
|   | 48 hours | clear | clear | clear |
| 2 ppm | 0 hours | clear | clear | clear |
|   | 4 hours | clear | clear | clear |
|   | 24 hours | clear | clear | clear |
|   | 48 hours | clear | clear | clear |
| 4 ppm | 0 hours | clear | clear | clear |
|   | 4 hours | clear | clear | clear |
|   | 24 hours | clear | clear | clear |
|   | 48 hours | clear | clear | clear |
| 8 ppm | 0 hours | clear | clear | clear |
|   | 4 hours | clear | clear | clear |
|   | 24 hours | clear | clear | clear |
|   | 48 hours | clear | clear | clear |
| Shock | — | clear | clear | clear |

TABLE III

COMPATIBILITY TESTING - CHLORINE AND CYANURATE AND TMS -DEIONIZED WATER-

| TMS | Time Observed | 0.5 ppm Cl 2.5 ppm Cyanurate | 1 ppm Cl 5 ppm Cyanurate | 5 ppm Cl 25 ppm Cyanurate | 10 ppm Cl 50 ppm Cyanurate | 20 ppm Cl 100 ppm Cyanurate |
|---|---|---|---|---|---|---|
| 0 | 0 hours | clear | clear | clear | clear | clear |
|   | 4 hours | clear | clear | clear | clear | clear |
|   | 24 hours | clear | clear | clear | clear | clear |
|   | 48 hours | clear | clear | clear | clear | clear |
| 2 ppm | 0 hours | clear | clear | clear | clear | clear |
|   | 4 hours | clear | clear | clear | clear | clear |
|   | 24 hours | clear | clear | clear | clear | clear |
|   | 48 hours | clear | clear | clear | clear | clear |
| 4 ppm | 0 hours | clear | clear | clear | clear | clear |
|   | 4 hours | clear | clear | clear | clear | clear |
|   | 24 hours | clear | clear | clear | clear | clear |
|   | 48 hours | clear | clear | clear | clear | clear |
| 8 ppm | 0 hours | clear | clear | clear | clear | clear |
|   | 4 hours | clear | clear | clear | clear | clear |
|   | 24 hours | clear | clear | clear | clear | clear |
|   | 48 hours | clear | clear | clear | clear | clear |
| Shock | — | clear | clear | clear | clear | clear |

TABLE IV

COMPATIBILITY TESTING - CHLORINE AND CYANURATE AND TMS -TAP WATER-

| TMS | Time Observed | 0.5 ppm Cl 2.5 ppm Cyanurate | 1 ppm Cl 5 ppm Cyanurate | 5 ppm Cl 25 ppm Cyanurate | 10 ppm Cl 50 ppm Cyanurate | 20 ppm Cl 100 ppm Cyanurate |
|---|---|---|---|---|---|---|
| 0 | 0 hours | clear | clear | clear | clear | clear |
| | 4 hours | clear | clear | clear | clear | clear |
| | 24 hours | clear | clear | clear | clear | clear |
| | 48 hours | clear | clear | clear | clear | clear |
| 2 ppm | 0 hours | clear | clear | clear | clear | clear |
| | 4 hours | clear | clear | clear | clear | clear |
| | 24 hours | clear | clear | clear | clear | clear |
| | 48 hours | clear | clear | clear | clear | clear |
| 4 ppm | 0 hours | clear | clear | clear | clear | clear |
| | 4 hours | clear | clear | clear | clear | clear |
| | 24 hours | clear | clear | clear | clear | clear |
| | 48 hours | clear | clear | clear | clear | clear |
| 8 ppm | 0 hours | clear | clear | clear | clear | clear |
| | 4 hours | clear | clear | clear | clear | clear |
| | 24 hours | clear | clear | clear | clear | clear |
| | 48 hours | clear | clear | clear | clear | clear |
| Shock | — | clear | clear | clear | clear | clear |

TABLE V

COMPATIBILITY TESTING - CALCIUM HARDNESS AND CHLORINE AND TMS -DEIONIZED WATER-

| TMS | Time Observed | 0.5 ppm Cl 50 ppm Calcium | 1.25 ppm Cl 125 ppm Calcium | 2.5 ppm Cl 250 ppm Calcium | 5 ppm Cl 500 ppm Calcium | 10 ppm Cl 1000 ppm Calcium | 20 ppm Cl 2000 ppm Calcium |
|---|---|---|---|---|---|---|---|
| 0 | 0 hours | clear | clear | clear | clear | clear | clear |
| | 4 hours | clear | clear | clear | clear | clear | clear |
| | 24 hours | clear | clear | clear | clear | clear | clear |
| | 48 hours | clear | clear | clear | clear | clear | clear |
| 2 ppm | 0 hours | clear | clear | clear | clear | clear | clear |
| | 4 hours | clear | clear | clear | clear | clear | clear |
| | 24 hours | clear | clear | clear | clear | clear | clear |
| | 48 hours | clear | clear | clear | clear | clear | clear |
| 4 ppm | 0 hours | clear | clear | clear | clear | clear | clear |
| | 4 hours | clear | clear | clear | clear | clear | clear |
| | 24 hours | clear | clear | clear | clear | clear | clear |
| | 48 hours | clear | clear | clear | clear | clear | clear |
| 8 ppm | 0 hours | clear | clear | clear | clear | clear | clear |
| | 4 hours | clear | clear | clear | clear | clear | clear |
| | 24 hours | clear | clear | clear | clear | clear | clear |
| | 48 hours | clear | clear | clear | clear | clear | clear |
| Shock | — | clear | clear | clear | clear | clear | clear |

TABLE VI

COMPATIBILITY TESTING - pH AND TMS -TAP WATER WITH 5 PPM Cl AND 25 PPM CYANURATE-

| TMS | Time Observed | pH 4 | pH 5 | pH 6 | pH 7 | pH 8.5 |
|---|---|---|---|---|---|---|
| 0 | 0 hours | clear | clear | clear | clear | clear |
| | 4 hours | clear | clear | clear | clear | clear |
| | 24 hours | clear | clear | clear | clear | clear |
| | 48 hours | clear | clear | clear | clear | clear |
| 2 ppm | 0 hours | clear | clear | clear | clear | clear |
| | 4 hours | clear | clear | clear | clear | clear |
| | 24 hours | clear | clear | clear | clear | clear |
| | 48 hours | clear | clear | clear | clear | clear |
| 4 ppm | 0 hours | clear | clear | clear | clear | clear |
| | 4 hours | clear | clear | clear | clear | clear |
| | 24 hours | clear | clear | clear | clear | clear |
| | 48 hours | clear | clear | clear | clear | clear |
| 8 ppm | 0 hours | clear | clear | clear | clear | clear |
| | 4 hours | clear | clear | clear | clear | clear |
| | 24 hours | clear | clear | clear | clear | clear |
| | 48 hours | clear | clear | clear | clear | clear |
| Shock | — | clear | clear | clear | clear | clear |

TABLE VII

COMPATIBILITY TESTING - TOTAL ALKALINITY AND TMS -TAP WATER WITH 5 PPM Cl AND 25 PPM CYANURATE-

| TMS | Time Observed | 20 ppm Alkalinity | 40 ppm Alkalinity | 80 ppm Alkalinity | 160 ppm Alkalinity |
|---|---|---|---|---|---|
| 0 | 0 hours | clear | clear | clear | clear |
| | 4 hours | clear | clear | clear | clear |
| | 24 hours | clear | clear | clear | clear |
| | 48 hours | clear | clear | clear | clear |
| 2 ppm | 0 hours | clear | clear | clear | clear |
| | 4 hours | clear | clear | clear | clear |
| | 24 hours | clear | clear | clear | clear |
| | 48 hours | clear | clear | clear | clear |
| 4 ppm | 0 hours | clear | clear | clear | clear |
| | 4 hours | clear | clear | clear | clear |
| | 24 hours | clear | clear | clear | clear |
| | 48 hours | clear | clear | clear | clear |
| 8 ppm | 0 hours | clear | clear | clear | clear |
| | 4 hours | clear | clear | clear | clear |
| | 24 hours | clear | clear | clear | clear |
| | 48 hours | clear | clear | clear | clear |
| Shock | — | clear | clear | clear | clear |

The anion of an aqueous sodium salt of bromphenol blue can be complexed with the cation of polymerized silanes of this invention while on a substrate. The blue colored complex, substantive to a water rinse, is qualitatively indicative of the presence of the cation on the substrate thus indicating the extent of antimicrobial agent on a given substrate. A comparison of the intensity of retained blue color to a color standard is used as a check to determine if the treatment has been applied properly.

The method consists of preparing a 0.02 to 0.04 weight percent solution of bromphenol blue in distilled water. This solution is made alkaline using a few drops of saturated $Na_2CO_3$ solution per 100 milliliters of the solution. Two to three drops of this solution are placed on the treated substrate and allowed to stand for two minutes. The substrate is then rinsed with copious amounts of tap water and the substrate is observed for a blue stain and it is compared to a color standard.

For a spectrophotometric determination, the following test is used.

The sodium salt of bromphenol blue is depleted from a standard solution by complexing with the cations on a treated substrate. The change in bromphenol blue concentration is determined spectrophotometrically or by comparison with color standards whereby the level of substrate treatment by the cationic silane is determinable.

The method consists of preparing a 0.02 weight percent standard solution of bromphenol blue in distilled water. It is made alkaline with a few drops of saturated $Na_2CO_3$ solution per 100 milliliters of bromphenol blue solution. The color of this solution is purple.

The blank solution is adjusted to yield a 10 to 12% transmittance reading when measured in 1 cm cells using a spectrophotometer set at 589 nm by the following method.

Fill a container ¾ full of distilled water and add Z ml of the 0.02% standard bromphenol blue solution for every 50 ml of distilled water. Add 0.5 ml of a 1% Triton ® X-100 surfactant (manufactured by Rohm and Haas, Philadelphia, Pa., U.S.A.) aqueous solution for every 50 ml of water. Mix, and using the spectrophotometer, determine the maximum absorbance. Adjust the upper zero to 100% transmittance with distilled water. Check the percent transmittance of the working bromphenol blue solution at the maximum absorbance setting. Adjust the blank solution to 10 to 12% transmittance with either water or bromphenol blue standard solution as necessary.

The samples of treated substrate are tested by placing 0.5 gram samples of the substrate standards in a flask large enough for substantial agitation of the sample and the test solution. Add 50 ml of the working solution. Agitate for 20 minutes on a wrist-action shaker. Fill the test curvette with the test solution. Centrifuge if particulate matter is present. Measure the % transmittance at the wavelength set forth above. The transmittance is compared against a standard curve prepared by preparing several substrate samples of known concentration of the cationic silane. For example, samples containing a known amount of cationic silane at, for example, 0%, 0.25%, 0.50%, 0.75% and 1% are read spectrophotometrically and a curve is plotted.

EXAMPLE 11

A swimming pool constructed to scale was built in an aquarium which included polyvinyl chloride walls and painted gunite walls. Water in the pool was conditioned to contain twenty parts per million chlorine and one-hundred parts per million cyanuric acid. Two rayon strips about three centimeters in width were located in the pool extending over its length and width. The TMS compound was added to the pool water in order to provide a concentration therein of four parts per million, or 1.7 parts per million based on active ingredients. At the end of forty-eight hours, the rayon strips were removed and stained with bromophenol blue in accordance with the foregoing procedure. A definite blue color was exhibited indicating an even deposition of TMS on the strips. Polyvinyl chloride and plaster strips representative of pool liner materials were also tested at concentration levels of TMS of eight, twelve, and sixteen, parts per million. At the end of forty-eight hours, the strips were removed, rinsed with tap water, dried, and analyzed in accordance with the above mentioned bromophenol blue test. In all cases, the blue color indicative of deposition was evidenced. At levels of eight, twelve, and sixteen, parts per million TMS, the level of TMS detected on the liner strips was found to be, respectively, one hundred ug/g of liner, one hundred-fifty ug/g of liner, and six hundred-fifty ug/g of liner. The level of TMS detectable in the pool water at the end of forty-eight hours was one ug/milliliter. Deposition of TMS on the strips was also evidenced at concentration levels in excess of sixteen parts per million, for example, at levels of from eighty to one hundred sixty parts per million TMS in the pool water. however, the preferred maximum was found to be about sixty parts per million TMS in any treatment.

EXAMPLE III

In order to demonstrate the effectiveness of the compound TMS in enhancing the cleanability and facilitating the removal of algae from surfaces prone to biofouling, the following tests were conducted employing coupon samples of polyvinyl chloride and plaster. A ten gallon glass tank was arranged having the coupons suspended therein. The tank was equipped with an upflow filter designed to push water through a filter media with an overflow return to the tank. A second tank was also used but equipped with a downflow filter which sucks water through a filter media and including a power return. Four foot fluorescent grow lights were installed behind each tank and in the tank covers. Room lights were left burning twenty-four hours per day. A tank heater was used to control the water temperature at eighty-five degrees Fahrenheit. Each tank was filled with nine gallons of water conditioned to a pH of 7.4, a total alkalinity of one hundred parts per million expressed as calcium carbonate, a calcium hardness of two hundred-fifty parts per million expressed as calcium carbonate, and a cyanuric acid concentration of one hundred parts per million. The additive materials for the tanks included HTH ®, a trademark for a calcium hypochlorite material containing seventy percent available chlorine and manufactured by Olin Chemicals, Stamford, Conn. The algae insult was a mixture of green, yellow, and black algae. A plant food was employed having ten percent urea nitrogen, eight percent phosphorous expressed as $P_2O_5$, seven percent potash expressed as $K_2O$, one tenth of one percent iron, five hundreds of one percent manganese, and five hundreds of one percent zinc. The plant food was added to each tank at the rate of five milliliters every other day. Each tank was used to conduct experiments under the following conditions:

1. Control: no treatment
2. TMS: eight parts per million

3. TMS: sixteen parts per million

| 4. | Chlorine | three parts per million |
|---|---|---|
| 5. | TMS | eight parts per million |
| | Chlorine | three parts per million |
| 6. | TMS | sixteen parts per million |
| | Chlorine | three parts per million |

The procedure followed in each instance was to insert the pool liner coupons. The tank was charged with conditioned water. The filter was activated and allowed to circulate water twenty-four hours per day. The tank was then dosed as noted above, with the chlorine in the form of HTH ®, the HTH ® being added to the pool water before the addition of TMS. The materials were allowed to disburse, and determinations were made on initial turbidity, pH, chlorine, and TMS levels, in the tank. The filter system was then inactivated for forty-eight hours in order to allow the TMS compound to migrate in order to cover the coupon surfaces. The filter system was then reactivated and the addition of the algae insult and plant food initiated. Monitoring was conducted daily on temperature, turbidity, pH, chlorine, and TMS levels. The coupons were also visually inspected for algae growth. The pH was controlled at levels between 7.2 and 7.6 by the addition, when necessary, of hydrochloric acid and sodium carbonate. The chlorine level was maintained at three parts per million in those instances where the tank contained chlorine as a treatment condition. Five milliliters of plant food was added daily, and after determining the pool water balance, the algae insult was added daily in a dosage of thirty milliliters until the algae was either visible in the water or on the coupon surfaces, at which time the algae insult was added every other day. Pool water was added when required in order to maintain a constant volume. For purposes of comparison, a second set of conditions was imposed on each tank, similar to conditions 1-6 set forth above, as follows:

| 7. | Control | no treatment |
|---|---|---|
| 8. | TMS | eight parts per million |
| 9. | TMS | sixteen parts per million |
| 10. | Chlorine | one and one-half parts per million |
| 11. | Calcium Citrate | sixteen parts per million |
| 12. | HTH ® | sixteen parts per million |

The procedure set forth above with regard to conditions 1-6 was followed in the case of conditions 7-12. Calcium citrate was used as a representative algicide, and the composition HTH ® in instance No. 12 was a composition containing eighty-nine percent available chlorine which functioned as another representative algicide. The results of the extensive tests conducted in accordance with this Example III indicated that the only coupon which was easier to clean was the coupon treated with sixteen parts per million of the compound TMS of the present invention.

The antimicrobial effectiveness of the compound TMS is generally known as evidenced by U.S. Pat. Nos. 3,730,701; 3,817,739; and 3,865,728; although the function of TMS in enhancing cleanability is not known. The mechanism can be explained by the fact that dead cells adjacent the surface form a release layer, which when disturbed by mechanical cleaning or flushing, free any accumulated algae and other microorganisms therefrom. The compound may be added into the pool water directly and allowed to migrate to the surfaces of the pool, or the compound may be sprayed on the pool surfaces during manufacture of the pool or when the pool is being reconditioned. The preferred level of the treatment is between 1.71 to 3.42 parts per million based on the active ingredients. In order to be effective, it is important that the compound employed and the concentration levels of the compound provide compatibility in the system in which the treatment is to be conducted, especially as in the case of a swimming pool, cloudiness or turbidity which persisted would not be acceptable for aesthetic reasons, in most instances. In environments where cloudiness, turbidity, and aesthetics, were not an issue, compatibility would not be a critical factor, such as in the treatment with the compounds of the present invention of filters, cooling towers, humidifier systems, heat exchangers, drainage systems, ponds, pipe lines, storage tanks, cisterns, sumps, boats, and other surfaces prone to microbiological soiling and fouling.

The treating can be carried out with the quaternary ammonium compounds of this invention per se. Often, however, it is desirable to extend the compounds of this invention by incorporating therein hydrocarbon or halohydrocarbon substituted siloxanes of the formula $$R_a SiO_{\frac{4-a}{2}}$$

in which R is a hydrocarbon or halohydrocarbon radical and a varies from 0 to 3. The incorporation of such siloxanes in no way effects the property of the quaternary ammonium compound so that the claims of this invention are construed to cover both the use of the quaternary ammonium siloxane per se and mixtures or copolymers of such siloxanes with said hydrocarbon substituted siloxanes or halohydrocarbon substituted siloxanes.

For example, surfaces can be treated with an aqueous solution of a mixture of 10 mols of monomethyl trimethoxysilane and 1 mol of $$Cl^- C_{18}H_{37}Me_2N^+(CH_2)_3Si(OMe)_3.$$

It has also been found that combinations of 1 mol $$Cl^- C_{18}H_{37}Me_2N^+(CH_2)_3Si(OMe)_3$$

and 0.5 mol of 3-chloropropyltrimethoxysilane give effective siloxane coatings. The use of hydrocarbon and halohydrocarbon siloxane extenders often give cheaper treatment than the pure quaternary siloxane.

It will be apparent from the foregoing that many other variations and modifications may be made in the compounds, compositions, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. A method of enhancing the cleanability and facilitating the removal of algae and other microorganisms and soils from surfaces prone to biofouling by being exposed to and brought into contact with aqueous media containing algae and other microorganisms, comprising immobilizing on said surfaces and bonding thereto a coating of an organosilane, the organosilane being compatible in the aqueous media which has the following concentrations:

| chlorine levels | 0.5 to | 20 ppm |
|---|---|---|
| cyanurates | 25 to | 100 ppm |
| calcium hardness | 50 to | 2,000 ppm |
| pH | 4 to | 8.5 |
| alkalinity | 20 to | 160 ppm; | forming on the coated surfaces a layer of dead cells of the algae and other microorganisms, utilizing the layer of dead cells as a release medium to facilitate removal of succeeding layers of algae and other microorganisms that accumulate thereon, and cleaning the surfaces by dislodging the accumulated layers from the release medium layer, the organosilane having the general formula selected from the group consisting of:

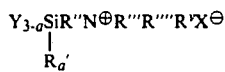

and

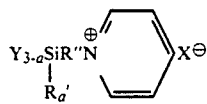

wherein, in each formula,

Y is R or RO where each R is an alkyl radical of 1 to 4 carbon atoms or hydrogen;

a has a value of 0, 1 or 2;

R' is a methyl or ethyl radical;

R" is an alkylene group of 1 to 4 carbon atoms;

R''', R'''' and $R^v$ are each independently selected from a group consisting of alkyl radicals of 1 to 18 carbon atoms, $-CH_2C_6H_5$, $-CH_2CH_2OH$, $-CH_2OH$, and $-(CH_2)_xNHC(O)R^{vi}$, wherein x has a value of from 2 to 10 and $R^{vi}$ is a perfluoroalkyl radical having from 1 to 12 carbon atoms;

X is chloride, bromide, fluoride, iodide, acetate or tosylate.

2. The method of claim 1 wherein the surfaces form the configuration of a swimming pool, and the organosilane is added to water contained therein and migrates to the pool surfaces to form the coating.

3. The method of claim 2 wherein the organosilane is added to the pool water in an amount sufficient to provide a concentration in the pool water in excess of about fifteen parts per million of the organosilane.

4. The method of claim 1 wherein the surfaces form the configuration of a swimming pool, the surfaces including a liner, and the organosilane is sprayed onto the liner in order to provide the coating.

5. The method of claim 4 wherein the level of the organosilane present as a coating on the liner is in excess of about five-hundred ug/g of liner.

6. A method as claimed in claim 1 wherein the organosilane has the formula

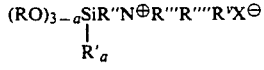

wherein each R is an alkyl radical of 1 to 4 carbon atoms or hydrogen; a has a value of 0, 1 or 2; R' is a methyl or ethyl radical; R" is an alkylene group of 1 to 4 carbon atoms; R''', R'''' and $R^v$ are each independently selected from a group consisting of alkyl radicals of 1 to 18 carbon atoms, $-CH_2C_6H_5$, $-CH_2CH_2OH$, $-CH_2OH$, and $-(CH_2)_xNHC(O)R^{vi}$, wherein x has a value of from 2 to 10 and $R^{vi}$ is a perfluoroalkyl radical having from 1 to 12 carbon atoms; X is chloride, bromide, fluoride, iodide, acetate or tosylate.

7. A method as claimed in claim 6 wherein a is zero, R is methyl, R" is propylene, R''', R'''' and $R^v$ are each methyl and X is chloride.

8. A method as claimed in claim 6 wherein a is zero, R is methyl, R" is propylene, R''' and R'''' are methyl, $R^v$ is butyl and X is chloride.

9. A method as claimed in claim 6 wherein a is zero, R is methyl, R" is propylene, R''', R'''' and $R^v$ are each ethyl and X is chloride.

10. A method as claimed in claim 6 wherein a is zero, R is methyl, R" is propylene, R''' and R'''' are each methyl, $R^v$ is octadecyl and X is chloride.

11. A method as claimed in claim 6 wherein a is zero. R is methyl, R" is propylene, R''' is methyl, R'''' and $R_v$ are each decyl and X is chloride.

12. A method as claimed in claim 6 wherein a is zero, R is methyl, R" is propylene, R''' and R'''' are methyl, $R^v$ is $-CH_2C_6H_5$ and X is chloride.

13. A method as claimed in claim 6 wherein a is zero, R is methyl, R" is propylene, R''' and R''', are methyl, $R^v$ is $-CH_2CH_2OH$ and X is chloride.

14. A method as claimed in claim 6 wherein a is zero, R is ethyl, R" is propylene, R''' and R'''' are methyl, $R^v$ is octadecyl and X is chloride.

15. A method as claimed in claim 6 wherein a is zero, R is ethyl, R" is propylene, R''' is methyl, R'''' and $R^v$ are decyl and X is chloride.

16. A method as claimed in claim 6 wherein a is one, R is methyl, R' is methyl, R" is propylene, R''' and R''' are methyl, $R^v$ is octadecyl and X is chloride.

17. A method as claimed in claim 6 wherein a is one, R is ethyl, R' is methyl, R" is propylene, R''' and R'''' are methyl, $R^v$ is octadecyl and X is chloride.

18. A method as claimed in claim 6 wherein a is one, R is methyl, R' is methyl, R" is propylene, R''' is methyl, R'''' and $R^v$ are decyl and X is chloride.

19. A method as claimed in claim 6 wherein a is one, R is ethyl, R' is methyl, R" is propylene, R''' is methyl, R'''' and Rv are decyl and X is chloride.

20. A method as claimed in claim 6 wherein a is two, R is methyl, R' is methyl, R" is propylene, R''' and R'''' are methyl, $R^v$ is octadecyl and X is chloride.

21. A method as claimed in claim 6 wherein a is two, R is ethyl, R' is methyl, R" is propylene, R''' and R'''' are methyl, $R^v$ is octadecyl and X is chloride.

22. A method as claimed in claim 6 wherein a is two, R is ethyl, R' is methyl, R" is propylene, R''' is methyl, R'''' and Rv are decyl and X is chloride.

23. A method as claimed in claim 6 wherein a is two R is ethyl, R' is methyl, R" is propylene, R''' is methyl, R'''' and $R^v$ are decyl and X is chloride.

24. A method as claimed in claim 6 wherein a is zero, R is methyl, R" is propylene, R''' and R'''' are methyl, $R^v$ is $-(CH_2)_xNHC(O)R^{vi}$ and X is chloride.

25. A method as claimed in claim 24 wherein x has a value of 2 and $R^{vi}$ is $-(CF_2)_6CF_3$.

26. A method as claimed in claim 24 wherein x has a value of 3 and $R^{vi}$ is $-(CF_2)_6CF_3$.

27. A method as claimed in claim 1 wherein the organosilane has the formula

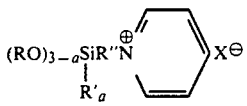

wherein R is an alkyl radical of 1 to 4 carbon atoms or hydrogen; a has a value of 0, 1 or 2; R' is a methyl or ethyl radical; R" is an alkylene of 1 to 4 carbon atoms; X is chloride, bromide, fluoride, iodide, acetate or tosylate.

28. A method as claimed in claim 27 wherein a is zero, R is methyl, R" is propylene, X is chloride and bonded to a pyridinyl nitrogen atom.

29. A method as claimed in claim 27 wherein a is zero, R is ethyl, R" is propylene, X is chloride and bonded to a pyridinyl nitrogen atom.

30. A method as claimed in claim 27 wherein a is zero, R is hydrogen, R" is propylene, X is chloride and bonded to a pyridinyl nitrogen atom.

31. A method of enhancing the cleanability and facilitating the removal of algae and other microorganisms, and stains and soils, from swimming pool surfaces prone to biofouling, soiling, and staining by being exposed to and brought into contact with aqueous media containing algae, other microorganisms, and soiling elements comprising immobilizing on said swimming pool surfaces and bonding thereto a coating of an organosilane, the organosilane being compatible in the aqueous media, forming on the coated swimming pool surfaces a layer of dead cells of the algae and other microorganisms, utilizing the layer of dead cells as a release medium to facilitate removal of succeeding layers of algae and other microorganisms that accumulate thereon, and cleaning the swimming pool surfaces by dislodging the accumulated layers from the release medium layer, the organosilane being present in an amount sufficient in order to prevent persistent cloudiness and turbidity in the aqueous media and having the general formula selected from the group consisting of:

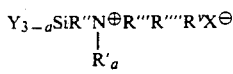

and

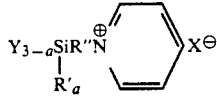

wherein, in each formula,

Y is R or RO where each R is an alkyl radical of 1 to 4 carbon atoms or hydrogen;
a has a value of 0, 1 or 2;
R' is a methyl or ethyl radical;
R" is an alkylene group of 1 to 4 carbon atoms;
R''', R'''' and R$^v$ are each independently selected from a group consisting of alkyl radicals of 1 to 18 carbon atoms, —CH$_2$C$_6$H$_5$, —CH$_2$—CH$_2$OH, and —(CH$_2$)$_x$NHC(O)R$^{vi}$ wherein x has a value of from 2 to 10 and R$^{vi}$ is a perfluoroalkyl radical having from 1 to 12 carbon atoms;
X is chloride, bromide, fluoride, iodide, acetate or tosylate.

32. A method of enhancing the cleanability and facilitating the removal of algae and other microorganisms from surfaces prone to biofouling by being exposed to and brought into contact with aqueous media containing algae and other microorganisms, comprising immobilizing on said surfaces and bonding thereto a coating of organosilanes, forming on the coated surfaces a layer of dead cells of the algae and other microorganisms, utilizing the layer of dead cells as a release medium to facilitate removal of succeeding layers of algae and other microorganisms that accumulate thereon, and cleaning the surfaces by dislodging the accumulated layers from the release medium layer, the organosilane having the general formula selected from the group consisting of:

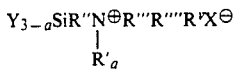

and

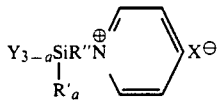

wherein, in each formula,

Y is R or RO where each R is an alkyl radical of 1 to 4 carbon atoms or hydrogen;
a has a value of 0, 1 or 2;
R' is a methyl or ethyl radical;
R" is an alkylene group of 1 to 4 carbon atoms;
R''', R'''' and R$^v$ are each independently selected from a group consisting of alkyl radicals of 1 to 18 carbon atoms, —CH$_2$C$_6$H$_5$, —CH$_2$CH$_2$OH, —CH$_2$OH, and —(CH$_2$)$_x$NHC(O)R$^{vi}$, wherein x has a value of from 2 to 10 and R$^{vi}$ is a perfluoroalkyl radical having from 1 to 12 carbon atoms;
X is chloride, bromide, fluoride, iodide, acetate or tosylate.

* * * * *